United States Patent [19]
Schibinger

[11] Patent Number: 5,321,644
[45] Date of Patent: Jun. 14, 1994

[54] METHOD AND APPARATUS FOR DIVISION ERROR DETECTION

[75] Inventor: Joseph S. Schibinger, Phoenixville, Pa.

[73] Assignee: Unisys Corporation, Blue Bell, Pa.

[21] Appl. No.: 971,492

[22] Filed: Nov. 4, 1992

[51] Int. Cl.⁵ ............................................. G06F 11/00
[52] U.S. Cl. ................................................. 364/737
[58] Field of Search ............... 364/737, 741, 715.01, 364/715.11

[56] References Cited

U.S. PATENT DOCUMENTS

| | | | |
|---|---|---|---|
| 3,588,484 | 6/1971 | Nishimoto et al. | 364/737 |
| 3,660,646 | 5/1972 | Minero et al. | 364/741 |
| 3,943,487 | 3/1976 | Pottle | 364/715.11 |
| 5,018,093 | 5/1991 | Shih | 364/741 |

Primary Examiner—David H. Malzahn
Attorney, Agent, or Firm—Robert R. Axenfeld; Mark T. Starr; Stanton D. Weinstein

[57] ABSTRACT

Method and apparatus for verifying the result of an arithmetic operation. The invention provides a time and cost efficient method of performing error detection on the result of an arithmetic operation; especially for a division operation. It does so through the novel use of a Carry-Save Adder (CSA). A CSA is known in the art to be faster and less costly to implement than the use of a full adder.

12 Claims, 4 Drawing Sheets

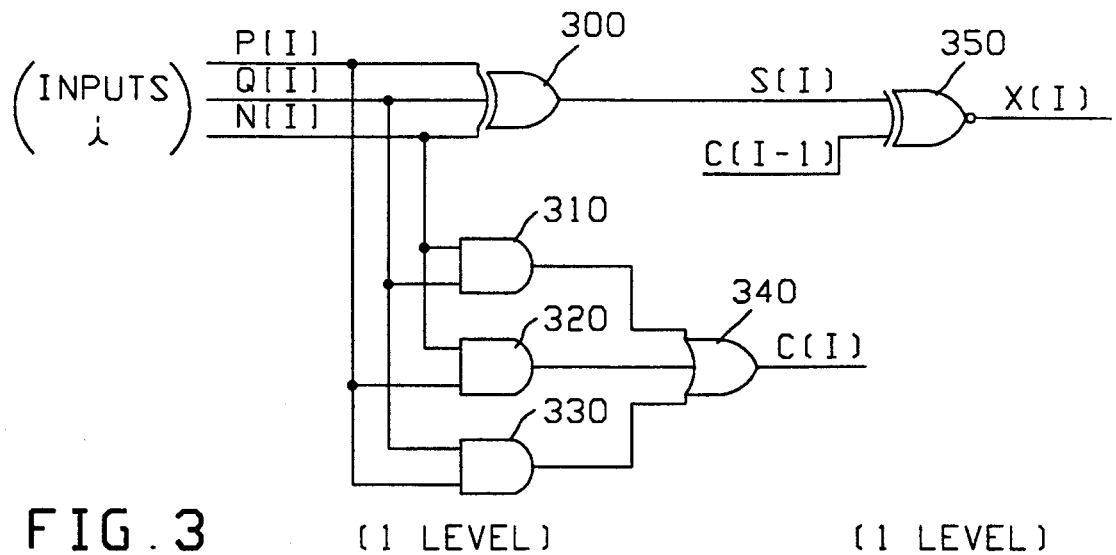
FIG.3   (1 LEVEL)   (1 LEVEL)
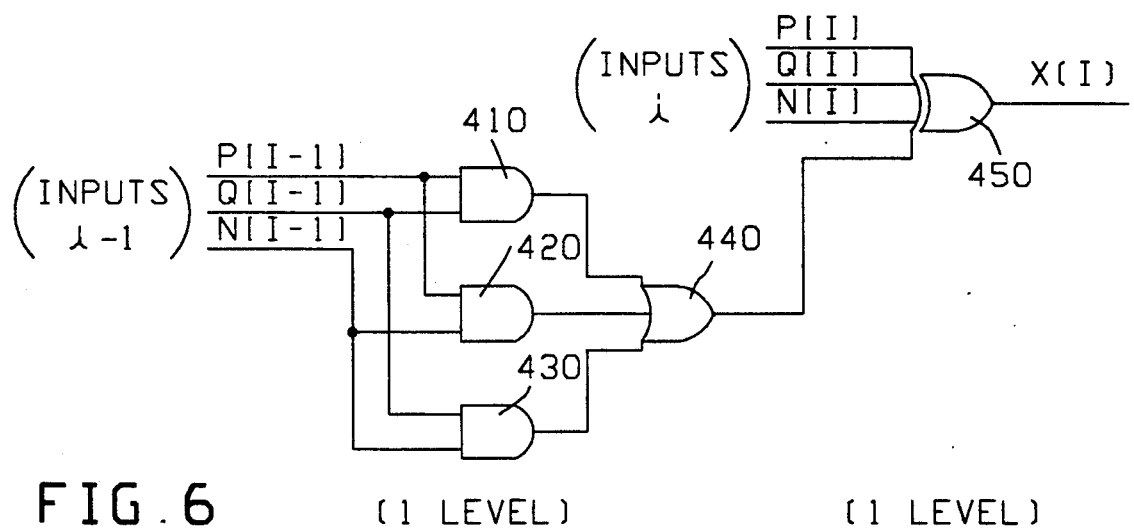
FIG.6   (1 LEVEL)   (1 LEVEL)
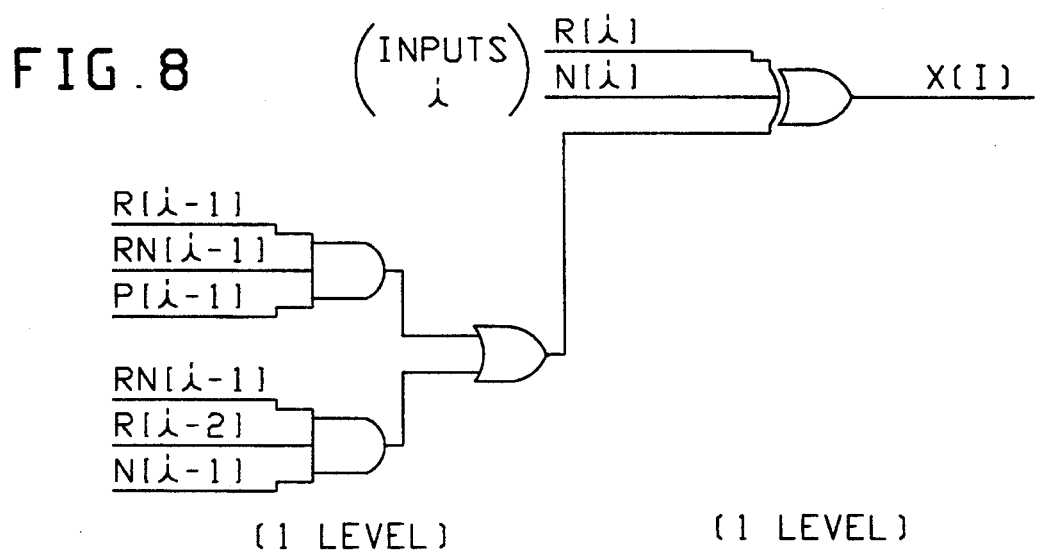
FIG.8   (1 LEVEL)   (1 LEVEL)

METHOD AND APPARATUS FOR DIVISION ERROR DETECTION

FIELD OF THE INVENTION

This invention relates to computer systems and the detection of errors which occur in the performance of arithmetic operations, especially for detecting division errors.

BACKGROUND OF THE INVENTION

One of the functions of most computers systems is to perform arithmetic operations. Occasionally, an error occurs during an arithmetic operation, often due to malfunction of hardware within the computer system. It is beneficial to detect such an error immediately when it occurs. Traditionally, the detection of such arithmetic errors is performed by providing a duplicate piece of hardware to perform a computation which verifies the main calculation. This can be expensive and potentially very slow.

For instance, in order to detect an addition error the obvious implementation shown in FIG. 1 is to provide an extra full adder 100 to produce the same sum as the original calculation. One would then use an exclusive "NOR" 110 for the width of the result in order to produce a value which indicates whether all of the bits in the first result and the second result were identical. Next, all the bits of the resulting indicator are "AND"ed 120 to generate a single bit result which indicates the success of the operation.

The prime objections to this method are the expense of the full adder 100 and the high propagation delay in performing the full add. Typically, a full adder propagates several outputs including a generate, a propagate, and a compliment of the given result. Once this addition is done there is still the need and expense of performing the exclusive "NOR" and the final "AND" on that result in order to get the single bit answer desired.

It is an object of the present invention to provide a fast and novel method of error detection for arithmetic operations. More particularly, it is an object of this invention to provide such an apparatus and method for detecting errors in a division operation.

It is another object of the present invention to provide a method of error detection which does not require the hardware expense of providing a full adder in the computer system.

SUMMARY OF THE INVENTION

This invention is directed to providing a time and cost efficient method of performing error detection on the result of an arithmetic operation; especially a division operation. It does so through the use of a Carry-Save Adder (CSA). A CSA is known in the art to be faster and less costly than the use of a full adder. A preferred embodiment of the present invention employs a CSA which accepts three inputs to produce the partial sum and carry bits of the three inputs. For purposes of this invention the inputs consist of the two integers which form the sum of the result being checked and the ones compliment of the result being checked.

The method takes advantage of the relationship between the operands of an arithmetic operation and the ones complement of the operation's result. Given two operands, P and Q, which when added yield a result R and given another input N, which is the ones compliment of R, then the sum of P plus Q plus N equals 2 to the power of L minus 1, where L is the width of the result being checked. This relation is easily proven:

If $(P+Q)-R=0$ Then $P+Q+N=(2-1)-1$

Note that the value on right side of the equal sign equates to all ones for the bits of a number represented in binary. Using this relationship P, Q and N are input to the CSA for the addition case to produce a result which is expected to yield all ones along the combination of the sum and carry bit output. Other combinations of inputs are employed to verify other arithmetic operations.

BRIEF DESCRIPTION OF DRAWINGS

FIG. 3 shows the logic diagram of the individual inputs and outputs of the CSA employed in a preferred embodiment of the present invention.

FIG. 6 shows the logic diagram of the individual inputs and outputs of the optimized CSA/XOR mechanism employed in a preferred embodiment of the present invention.

FIG. 8 shows the logic diagram of the individual inputs and outputs of a combined CSA/XOR mechanism employed in a preferred embodiment of the present invention.

DETAILED DESCRIPTION OF THE INVENTION

As described above, the subject invention puts a multiple input Carry Save Adder (CSA) to advantageous use to perform error checking on an arithmetic result by employing the following relationship. The method relies upon $(P+Q)=R$ and $(P+Q+N)=(2^{**}L)-1$, where N is the one's complement of R and L is the width of R. The sum $(P+Q+N)$ should yield a result of all ones among the bits of the sum and carry bits of a CSA.

Figure 1:
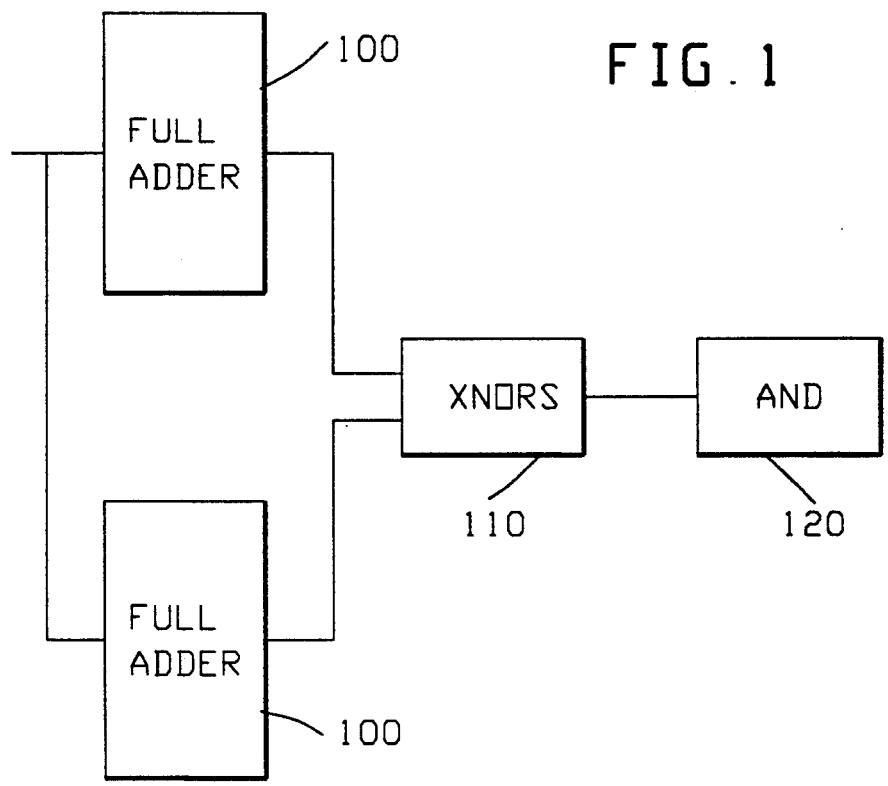
FIG. 1 depicts a mechanism employed in the prior art to perform arithmetic error checking.
Figure 2:
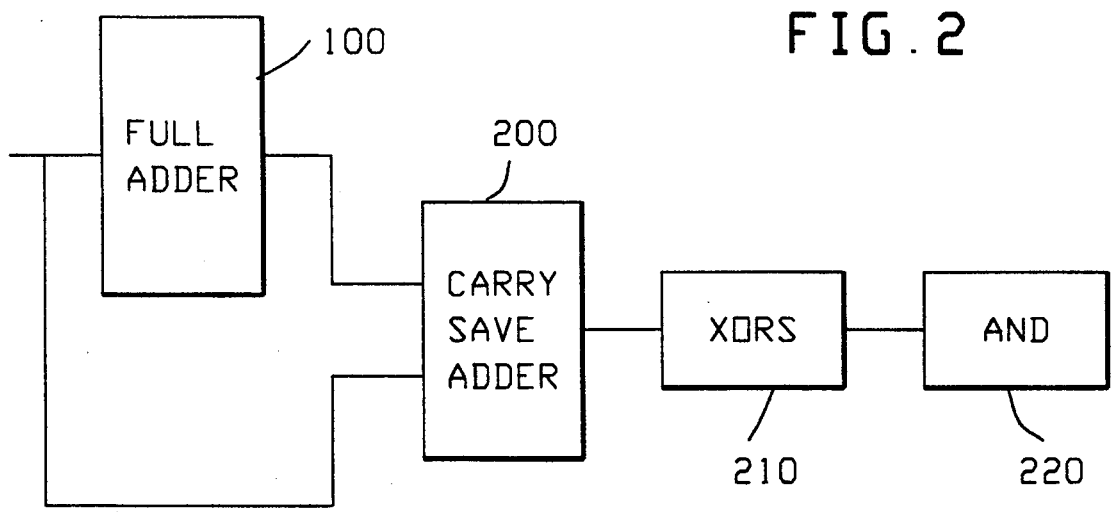
FIG. 2 depicts a preferred embodiment of the CSA mechanism of the present invention.

In a preferred embodiment shown in FIG. 2 which uses a three input CSA 200 to produce a partial sum, S, and a carry, C, of inputs P, Q and N, an exclusive "OR" 210 of S and C must be all true if R is correct. This method verifies the arithmetic operation in a less expensive and more rapid manner than the use of a full adder as employed in the previous art.

Given that each element of the CSA may be indexed with an index I, the CSA in the preferred embodiment has inputs P[I], Q[I] and N[I] and outputs C[I] and S[I]. In such an environment the sum $(S+(C*2))=(P+Q+N)$. The following table shows more clearly how the elements of the Carry Save Adder are related:

TABLE 1

| CSA inputs | 0 | P[L] | P[L-1] ... P[1] | P[0] |
|---|---|---|---|---|
| | 0 | Q[L] | Q[L − 1] ... Q[1] | Q[0] |
| | 1 | N[L] | N[L − 1] ... N[1] | N[0] |
| CSA outputs | 1 | S[L] | S[L − 1] ... S[1] | S[0] |
| + | C[L] | C[L − 1] | C[L − 2] ... C[0] | 0 |
| | SUM[L + 1] | SUM[L] | SUM[L − 1] ... SUM[1] | SUM[0] |

As the sum is generated from right to left each bit of the sum equals S[I] XOR C[I−1], provided there is not a carry generated to its right. Thus, if there are no carries the relation is true if all the exclusive "OR"s of S[I] and C[I−1] are true. Also, the right most column which generates a carry must produce a zero sum because there are only 2 inputs. The exclusive "OR" of that column also produce a one result.

If S is all ones and a carry exists, the relation is false because the exclusive "OR"s are not all ones thus indicating an error in result R. In this way it can be seen that the exclusive "OR" function of S and C is sufficient to produce the equal relation of (P+Q)=R.

The first step for checking such an addition in this three input embodiment shown in FIG. 2 is to use the CSA 200 to produce the partial results S and C for inputs P, Q and N. Next use L exclusive "OR" gates 210 to produce X where X[I]=(S[I] XOR C[I−1]). Next perform a logical "AND" 220 on all the bits of X to generate the result. A one result indicates no error has occurred.

FIG. 3 shows how the CSA results are generated at a bit level. Inputs P[I], Q[I], and N[I] are input to an XOR gate 300 to yield bit S[I]. Each of the three possible unique two input combinations of inputs P[I], Q[I], and N[I] are input to an AND gate 310, 320, 330. The output of each AND gate is input to an OR gate 340 to yield bit C[I]. Bits S[I] and C[I-1] are then input to a XOR gate 350 to yield bit X[I].

Figure 4:
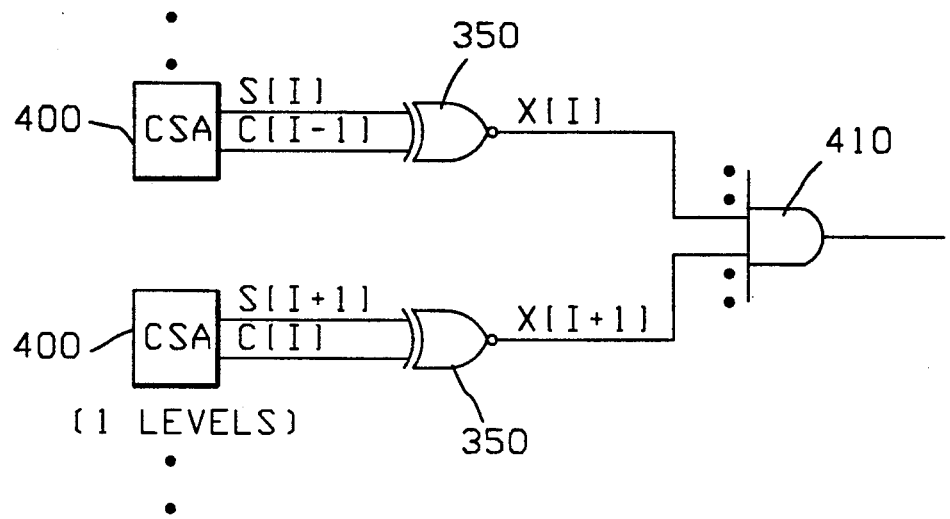
FIG. 4 shows the logic diagram of the output of a CSA employed in a preferred embodiment of the present invention shown in FIG. 3.

FIG. 4 shows how the individual bit level outputs of each CSA 400 are fed to a XOR gate 350 to yield each bit of X. The individual bits of X are then input to an AND gate 410 to yield the final result.

Figure 5:
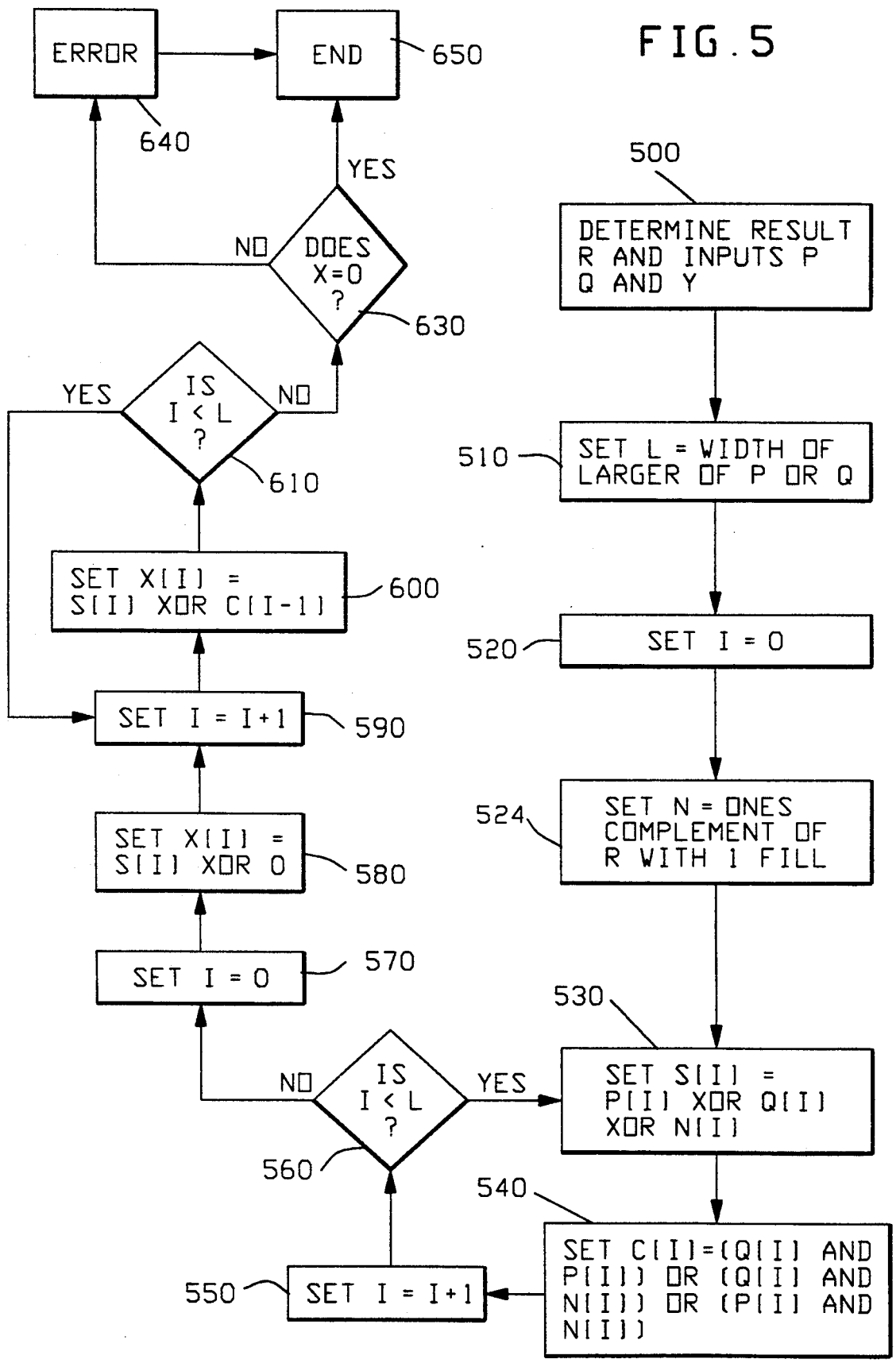
FIG. 5 is a flow chart which depicts the method employed in a preferred embodiment of the present invention.

The method of an embodiment of the present invention is shown by the flow chart of FIG. 5. First perform the arithmetic operation 500 to determine the result, R. Also determine the inputs, P, Q, and potentially Y which are appropriate to check result R. For instance, for the addition case P and Q would be the two operands of the addition. For division, P and Q would be determined by shifting the operands with zero fill and adding in Y as the remainder as described hereinafter.

Set L equal to the number of valid bits in either input P or Q 510, whichever value is larger. Set I equal to 0 at step 520. Next determine the one's compliment, N, of result R 524 filling any used bits with a value of one.

Set S[I] at step 530 to P[I] XOR Q[I] XOR N[I]. Determine C[I] at step 540 using (Q[I] AND P[I]) OR (Q[I] AND N[I]) OR (P[I] AND N[I]). Increment I 550 then compare I to L, the number of valid bits in the inputs which need to be processed 560. If I is less than L, return to step 530 and continue.

If I is not less than L, reset I to zero at step 570. Set X[I]=S[0] XOR 0 at 580 since C[−1] may not be valid reference. Increment I at 590. Set X[I]=S[I] XOR C[I-1] 600. Compare I to L 610 and if I is less than L return to step 590. If not, determine if all the bits of X equal 1 at step 630. If not, handle the error 640. If X=1 the operation was successful.

While the above embodiment employed a three input CSA using P, Q, and N, it will be obvious to those skilled in the art that an additional input to the CSA could be used advantageously to check multiple operand results.

Another implementation of the above of error checking mechanism would be to employ it to check the multiplication of operands. This embodiment employs the 3 input CSA described above. It checks the operation where (P * Q) yields R and where N is the ones compliment of R.

First, P is input into two of the inputs of the CSA and N is entered into the third input. The value of P in each of the inputs is shifted to achieve a value equivalent to multiplying P by the value of Q. For example, if Q equals 5 then one P input is shifted two bits to the left effecting a multiplication by 4. The other P input is unshifted effecting a multiplication by 1. The sum of the two P inputs should equal the result R which was P times Q. The table below should help make this example more clear:

TABLE 2

| CSA inputs | 0 | P[L] | P[L − 1] | P[L − 2] ... P[1] | P[0] | 0 | 0 |
|---|---|---|---|---|---|---|---|
| | 0 | 0 | 0 | P[L] ... P[3] | P[2] | P[1] | P[0] |
| | 1 | 1 | 1 | N[L] ... N[3] | N[2] | N[1] | N[0] |
| CSA outputs | 1 | S[L] | S[L − 1] | S[L − 2] ... S[3] | S[2] | S[1] | S[0] |
| | C[L] | C[L − 1] | C[L − 2] | C[L − 3] ... C[2] | C[1] | C[0] | 0 |

Note that the undefined values for the two inputs are zero filled. Note also that the undefined values for the N input are one filled. This is merely consistent with the respective definition of these values.

Employing the previously described embodiment, the CSA produces the partial results S[I] and C[I] of the three inputs. Next, the exclusive "OR" of S[I] and C[I−1] yields X[I]. Finally, the bits of X are logically "AND"ed to generate a result. A zero result indicates an error.

Another useful implementation of the above method of error checking is for a division operation. Given a dividend, Q, divided by a divisor, P, a result, R, is generated. However, there may be situations where P does not divide evenly into Q and a remainder, Y, will also result. One means of employing the above described error checking method requires at least 4 inputs on the CSA. Result, R, would be put into 2 of the inputs and shifted appropriately as in the multiplication case described above. A third input would be used to input the remainder, Y, and finally the 4th input would have N as its input. In such a situation, all of the above described operations for producing S and C and operating on that result are the same.

This invention may still be employed to check a division operation when a CSA with only 3 inputs is available. In one implementation the result, R, is entered into 2 of the inputs. One of the R inputs is shifted sufficiently to the left to permit the remainder, Y, to be entered into the right most bits of that input. For example, the maximum remainder for a division by 3 is 2 which requires 2 bits for its binary representation. In this situation, one R input is shifted left 2 bits permitting the entry of the Y result in the right most 2 bits of that input. Note that this produces (R*4)+Y. Since the goal in this example is for the two R inputs to yield (3*R)+Y, the second R input is negated. This yields (R*4)+Y+(−R)=(R*3)+Y as desired. The following table may be helpful in understanding this example:

TABLE 3

| CSA inputs | 0 | R[L] | R[L − 1] | R[L − 2] ... R[1] | R[0] | Y[1] | Y[0] |
|---|---|---|---|---|---|---|---|
| | (0 | 0 | 0 | R[L] ... R[3] | R[2] | R[1] | R[0]) |
| | 1 | 1 | 1 | N[L] ... N[3] | N[2] | N[1] | N[0] |
| CSA outputs | 1 | S[L] | S[L − 1] | S[L − 2] ... S[3] | S[2] | S[1] | S[0] |
| | C[L] | C[L − 1] | C[L − 2] | C[L − 3] ... C[2] | 1 | C[0] | C[−1] |

The ones compliment, N, of the divident, Q, is entered in the third input. The three inputs are added to yield S and C. Note that this is a true add where the negative value of the second input causes a subtraction. The results of S and C are handled from this point on as described previously. A zero result on the final "AND" of X indicates an error.

There is another embodiment which is employed in a preferred embodiment of the present invention to perform division error checking. Enter the result, R, into each of the first 2 inputs. Shift one input left sufficiently to shift in not less than the maximum possible remainder value minus 1. Shift the other inputs as described above to yield within one of the proper final result. For instance, in table 4 shown below an example for a divide by 3 is shown.

TABLE 4

| CSA inputs | 0 | R[L] | R[L − 1] ... R[1] | R[0] | Y[1] | Y[0] | 0 |
|---|---|---|---|---|---|---|---|
| | 0 | 0 | R[L] ... R[2] | R[1] | R[0] | Y[1] | Y[0] |
| | 1 | 1 | N[L] ... N[2] | N[1] | N[0] | 1 | 1 |
| CSA outputs | 1 | S[L] ... S[L−1] ... | | S[2] | S[1] | S[0] | S[−1] | S[−2] |
| | | C[L + 1] C[L] ... | | C[1] | C[0] | C[−1] | C[−2] | C[−3] |

The remainder, Y, is input by extending inputs 1 and 2 by Y and input N by 1's. The following truth table shows the amount added to column 0, which is the column where N[0] is located, for this example.

TABLE 5

| Y[1] | Y[0] | Col 0 | in | C[−1] |
|---|---|---|---|---|
| 0 | 0 | 0 | | 0 |
| 0 | 1 | 0 | | 1 |
| 1 | 0 | 1 | | 1 |
| 1 | 1 | — | | — (error case) |

The operations on the three inputs are the same as described in the first embodiment above to yield S and C which are then used to yield X.

Given all the above situations in which a CSA is employed to check the result of an arithmetic operation there is yet another improvement that may be employed to check the result. Specifically, this improvement is to combine the CSA function and the exclusive "OR" function into a single function, F, through the use of standard minimization techniques. The exact equations will depend on which of the given above described embodiments is employed.

FIG. 6 is a logic diagram of how this is accomplished at the bit level for the set of inputs used in the embodiment of FIG. 3. As in FIG. 3, the three possible unique two input combinations of inputs P[I−1], Q[I−1], and N[I−1] are input to an AND gate 410, 420, 430. The output of each AND gate is input to an OR gate 440 to yield bit C[I−1]. The improvement is to avoid the step of creating S[I] explicitly by employing a 4 input XOR gate 450. Inputs P[I], Q[I], and N[I] are fed directly to XOR gate 450 with C[I−1] as the fourth input to yield X[I]. This eliminates XOR gate 300 and the XOR gate 350 shown in FIG. 3.

Figure 7:
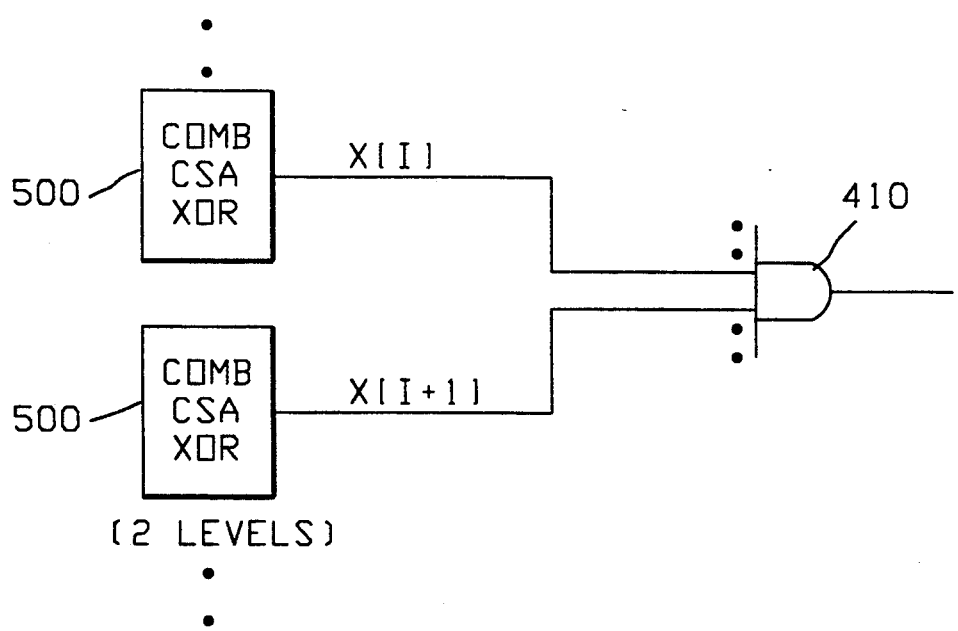
FIG. 7 shows the logic diagram of the output of a combined CSA/XOR mechanism employed in a preferred embodiment of the present invention.

FIG. 7 depicts how the individual bit level outputs of the combined CSA/XOR mechanism 500 yield each bit of X. As in FIG. 4 the individual bits of X are then input to an AND gate 410 to yield the final result.

Standard minimization techniques may yield further improvements depending on the operation being checked. For the embodiment where division by three is checked and the input is shifted sufficient to shift in not less than the maximum possible remainder minus 1 the following set of equations are true.

$$S[i] = R[i] \text{ XOR } R[i-1] \text{ XOR } N[i]$$

$$C[i-1] = (R[i-1] \text{ AND } R[i-2]) \text{ OR } (R[i-1] \text{ AND } N[i-1]) \text{ OR } (R[i-2] \text{ AND } N[i-1])$$

$$X[i] = S[i] \text{ XOR } C[i-1]$$

Substituting for S and C yields:

$$X[i] = R[i] \text{ XOR } R[i-1] \text{ XOR } N[i] \text{ XOR } ((R[i-1] \text{ AND } R[i-2]) \text{ OR } (R[i-1] \text{ AND } N[i-1]) \text{ OR } (R[i-2] \text{ AND } N[i-1]))$$

Following the standard minimization yields:

$$X[i] = R[i] \text{ XOR } N[i] \text{ XOR } ((R[i-1] \text{ AND } RN[i-2] \text{ AND } P[i-1]) \text{ OR } (RN[i-1] \text{ AND } R[i-2] \text{ AND } N[i-1])) \qquad (1)$$

Where RN=not R and N=not Q.

Referring to Table 4 for the above if i=1 then R[i−2]=Y[1]

If i = 0 then R[i − 1] = Y[1]  R[i − 2] = Y[0]
Q[i − 1] = 0  N[i − 1] = 1.

Using this method X is computed by performing on a computer the series of logical operation steps described by equation 1 above. FIG. 8 depicts the logic diagram at the bit level for this optimized version of the CSA/XOR functions.

On a typical processor this has about the same execution time as the steps for the CSA function described above without requiring the hardware expense of a CSA. Note also that the step of the final XOR on S[i] and C[i−1] to produce X has been eliminated thus yielding X in an even more efficient manner. Similar minimization techniques may be applied to other such embodiments.

While the above set of embodiments have focused upon the use of a three input Carry Save Adder to accomplish error checking, it will be obvious to one skilled in the art that the availability of additional inputs would broaden the applicability of such error checking to permit a more diverse set of checking to occur. Specifically, the availability of additional inputs would broaden the number of cases where this method could be used to check the results of a given divisor which may not be possible in the three input CSA case.

A system and method has also been revealed to utilize minimization of the logical operations involved to determine the series of logical operations which may be employed to accomplish such error checking without the use of a CSA. Those skilled in the art will recognize that this may yield a system which is more efficient than employing a hardware CSA.

What is claimed:

1. A system for verifying the result of an arithmetic operation comprising:
   a carry save adder;
   a plurality of exclusive OR gates coupled to a plurality of outputs of said carry save adder;
   an AND gate coupled to an output of each of said exclusive OR gates;
   wherein one of a plurality of input signals coupled to said carry save adder represents the ones compliment of said result.

2. The system of claim 1, wherein said carry save adder is comprised of a plurality of logical operation means.

3. The system of claim 1, wherein said carry save adder is combined with said exclusive OR into a single combined means.

4. The system of claim 3, wherein said combined means is comprised of:
   a plurality of AND gates;
   a OR gate coupled to a plurality of outputs to said plurality of AND gates;
   an exclusive OR gate coupled to a output of said OR gate and a plurality of input signals.

5. A method of verifying an arithmetic operation comprising the steps of:
   performing the arithmetic operation using a plurality of operands yielding a result;
   determining the ones compliment of said result;
   using said ones compliment of said result and said plurality of operands as a plurality of inputs to a carry save adder to yield a sum and a carry;
   performing an exclusive OR of a plurality of bits of said sum and said carry to yield a plurality of error check values;
   performing an AND of said error check values to yield a final value equal to one;
   indicating an error occurred if said final value does not equal one.

6. The method of claim 5, wherein said arithmetic operation is an addition.

7. The method of claim 5, wherein said arithmetic operation is a multiplication operation.

8. The method of claim 7, wherein said plurality of operand inputs are shifted to achieve a value equivalent to multiplying one operand input by the value of another operand input.

9. The method of claim 5, wherein said arithmetic operation is a division operation.

10. The method of claim 9 further comprising:
    determining the ones compliment of a divident.

11. The method of claim 10, wherein said plurality of operand inputs are replaced by a plurality of results from the division operation and said ones compliment of said result is replaced by ones compliment of the divident.

12. The method of claim 11, wherein said plurality of results from the division operation is shifted to include a remainder value.

* * * * *